United States Patent
Balogh (10) Patent No.: US 8,364,831 B2
(45) Date of Patent: *Jan. 29, 2013

(54) METHOD AND EQUIPMENT FOR ACCESSING A TELECOMMUNICATION NETWORK

(75) Inventor: Peter Balogh, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/273,358

(22) Filed: Oct. 14, 2011

(65) Prior Publication Data

US 2012/0030353 A1 Feb. 2, 2012

Related U.S. Application Data

(63) Continuation of application No. 12/198,362, filed on Aug. 26, 2008, which is a continuation of application No. 09/785,518, filed on Feb. 20, 2001, now Pat. No. 7,430,604.

(30) Foreign Application Priority Data

Feb. 24, 2000 (FI) ..................................... 20000431

(51) Int. Cl.
G06F 15/16 (2006.01)
G06F 15/173 (2006.01)

(52) U.S. Cl. .................. 709/229; 709/225; 709/227

(58) Field of Classification Search .................. 709/225, 709/227, 229
See application file for complete search history.

(56) References Cited

U.S. PATENT DOCUMENTS

| | | | |
|---|---|---|---|
| 5,428,666 A | 6/1995 | Fyfe et al. | |
| 5,442,806 A | 8/1995 | Barber et al. | |
| 5,613,213 A | 3/1997 | Naddell et al. | |
| 5,734,980 A | 3/1998 | Hooper et al. | |
| 5,815,811 A | 9/1998 | Pinard et al. | |
| 5,839,070 A | 11/1998 | Lupien et al. | |
| 5,903,832 A | 5/1999 | Seppanen et al. | |
| 5,915,214 A | 6/1999 | Reece et al. | ................. 455/406 |
| 5,950,130 A | 9/1999 | Coursey | |
| 5,987,011 A | 11/1999 | Toh | |
| 5,987,062 A | 11/1999 | Engwer et al. | |
| 5,991,287 A | 11/1999 | Diepstraten et al. | |
| 6,047,180 A | 4/2000 | Coutant | |
| 6,125,283 A | 9/2000 | Kolev et al. | |
| 6,134,453 A | 10/2000 | Sainton et al. | |
| 6,148,197 A | 11/2000 | Bridges et al. | |
| 6,259,405 B1 | 7/2001 | Stewart et al. | |

(Continued)

FOREIGN PATENT DOCUMENTS

| | | |
|---|---|---|
| EP | 781064 | 5/1997 |
| EP | 786915 | 7/1997 |

(Continued)

OTHER PUBLICATIONS

"Simplify Mobile Computer Network Access", Sumantex White Paper Series, vol. XLVI, 1999, 12 pgs.

(Continued)

Primary Examiner — Kristie Shingles
(74) Attorney, Agent, or Firm — Harrington & Smith (57) ABSTRACT

A method for accessing a network in a telecommunication system which comprises at least one terminal and a plurality of networks in which information sets describing settings needed to access networks and their resources are stored in the terminal. The terminal scans for information about available networks. Available information sets are determined by comparing the information about available networks to the stored information sets. At least one network is accessed based on the settings defined in the available information sets.

20 Claims, 3 Drawing Sheets

U.S. PATENT DOCUMENTS

| | | |
|---|---|---|
| 6,314,082 B1 | 11/2001 | Malmgren |
| 6,400,946 B1 | 6/2002 | Vazvan et al. ............... 455/432.1 |
| 6,405,040 B1 | 6/2002 | Liu et al. |
| 6,466,802 B1 | 10/2002 | Blakeney, II et al. |
| 6,473,413 B1 | 10/2002 | Chiou et al. |
| 6,564,055 B1 | 5/2003 | Hronek |
| 6,591,103 B1 | 7/2003 | Dunn et al. |
| 6,614,769 B1 | 9/2003 | Erlick et al. .................. 370/331 |
| 6,625,451 B1 | 9/2003 | La Medica et al. |
| 6,708,033 B1 | 3/2004 | Linkola et al. ................. 455/440 |
| 6,728,215 B1 | 4/2004 | Alperovich et al. .......... 370/252 |
| 6,748,214 B1 | 6/2004 | Wallstedt et al. |
| 6,751,472 B1 | 6/2004 | Muhonen et al. |
| 6,754,491 B2 | 6/2004 | Konno et al. |
| 6,771,961 B2 | 8/2004 | Bamburak et al. |
| 6,934,558 B1 | 8/2005 | Sainton et al. |
| 6,961,762 B1 | 11/2005 | Yeap et al. |
| 6,965,948 B1 | 11/2005 | Eneborg et al. |
| 7,096,015 B2 | 8/2006 | Bridges et al. |
| 7,103,661 B2 | 9/2006 | Klein |
| 7,430,604 B2 * | 9/2008 | Balogh ......................... 709/229 |
| 7,769,382 B2 | 8/2010 | Rasanen ....................... 455/436 |
| 2002/0022483 A1 | 2/2002 | Thompson et al. |
| 2008/0316989 A1 * | 12/2008 | Balogh ......................... 370/338 |

FOREIGN PATENT DOCUMENTS

| | | |
|---|---|---|
| EP | 822667 | 2/1998 |
| EP | 1059822 | 12/2000 |
| GB | 2292047 | 2/1996 |
| WO | WO-9614719 | 5/1996 |
| WO | WO-9707642 | 2/1997 |
| WO | WO-9742781 | 11/1997 |
| WO | WO-9744975 | 11/1997 |
| WO | WO-9810617 | 3/1998 |
| WO | WO 99/16263 A2 | 4/1999 |
| WO | WO-9925140 | 5/1999 |
| WO | WO-01/58190 A1 | 8/2001 |

OTHER PUBLICATIONS

"Draft Standard for Information Technology: Part II Wireless LAN Medium Access Control (MAC) and Physical (PHY) Specifications," LAN MAN Standards Committee of the Computer Society, 1999, 531 pgs.

Perkins, "Mobile-IP, Ad-Hoc Networking, and Nomadicity," Computer Software and Applications Conference, 1996 COMSAC '95, Proceedings of 20$^{th}$ International, 1996, pp. 472-476.

* cited by examiner

Fig. 1

| WLAN-specific settings | Non-WLAN-specific settings |
|---|---|
| Operation mode ! (ad-hoc/Infrastructure) | DHCP usage (Yes/no) |
| Network name ! | TCP/IP settings: |
| Channel ! (automatic/manually set) | IP addresses |
| Data rate | Gateways |
| WEP related settings: | DNS servers |
| Key length | WINS servers |
| Key mode | Proxy settings |
| Default key | Domain logon and workgroup settings |
| Keys or names of keys | Other |
| Other | |

METHOD AND EQUIPMENT FOR ACCESSING A TELECOMMUNICATION NETWORK

CROSS-REFERENCE TO RELATED APPLICATIONS

This is a continuation patent application of U.S. patent application Ser. No. 12/198,362 filed on Aug. 26, 2008, which is a continuation of U.S. patent application Ser. No. 09/785,518, filed on Feb. 20, 2001 now U.S. Pat. No. 7,430,604, which, in turn, claims priority to Finnish Patent Application No. FI 2000-0431, filed on Feb. 24, 2000, the contents of which are hereby incorporated by reference in their entireties.

BACKGROUND

This disclosure relates to a method and equipment for accessing a network in a telecommunication system.

The portion of mobile workforce with portable computers is growing all the time. These mobile users need to access their computer networks from multiple locations. Besides ordinary local area networks, wireless local area networks (WLANs) have entered the markets enabling wireless access to computer networks. WLANs provide the ease of use as no cables are needed. Typically WLANs use radio frequency technologies; however, it is also possible to use e.g. infra-red connections. As cellular telecommunication systems, WLANs provide wireless connectivity using cells, called microcells. WLAN access is provided with WLAN adapters, which are implemented as PC cards in portable computers, ISA or PCI cards in desktop computers or integrated within hand-held computers.

There are many system settings involved when a terminal is accessing a wired or a wireless network. Typically needed settings are: connection method, dial-in settings, IP (Internet Protocol) settings and application settings. The connection method specifies the connection type, e.g. a direct network connection or a modem connection. Dial-in settings specify at least the access telephone number and dialing prefix, IP settings comprise the needed parameters for accessing IP networks, and application settings set the parameters required by popular applications. There may also be settings identifying network resources such as printers, shared folders, and mapped network drives to be used from a particular location. Typically the settings need to be changed manually every time when the used network changes.

Besides ordinary settings needed for accessing and using wired LANs, there are a number of WLAN specific settings that are different in various WLAN networks. WLAN users need to change network settings manually every time they want to access a different network. Many users are not familiar with different network settings and they may need to contact IT (Information Technology) support persons for help. This adds expenses and takes time.

SUMMARY

One embodiment of this disclosure may be used to facilitate the access to telecommunication networks for mobile users. One aspect of this embodiment may be achieved with a method and a terminal which are characterized by the recitations of the independent claims. Other embodiments and aspects of this disclosure are set forth in the dependent claims.

On embodiment is based on storing information sets describing settings needed to access networks and their resources. The terminal performs scanning in order to find out information about the available networks. Scanning means any kind of activity to find out available networks in the area of the terminal. The available information sets may then be determined by comparing the information about the available networks to the stored information sets. As the available information sets are determined, at least one network may be accessed based on the settings described in the available information sets.

One advantage of the above is that users do not need to know what settings are needed and how to change the settings when connecting to a network. The IT staff may collect needed settings under information sets and store settings for different networks beforehand. This saves time and expenses as less user intervention is needed when accessing a network.

In one embodiment of this disclosure, the network names are stored in the information sets. Network names may be any kind of identities that can be used to separate networks. In this embodiment the terminal performs the scanning by sending network identity requests and searching for network identity responses. The terminal then determines the available information sets by comparing the stored network names to the scanned information identifying the network names of the available networks. This preferred embodiment has the further advantage that the terminal can reliably determine the available networks and information sets, typically also the existing network names and identity requests may be used.

In another embodiment of this disclosure, the information sets are stored separately for each network on a smart card. Although in this embodiment the settings stored are network-specific, there may also be settings related to other networks. Network-specific means here mainly that the settings related to typically first accessed networks, for instance a wireless local area network, are in separate information sets. The further advantages of this embodiment are that the usage of settings can be controlled by smart card access control methods and the information sets may be easily used in different mobile terminals.

Yet in another embodiment, the user is notified about the available information sets. The user is also provided with the opportunity to select one of the available information sets or approve the available information set. At least one network is then accessed based on the settings defined in the information set the user has accepted. The further advantage of this embodiment is that the user has the chance of controlling the information set selection.

BRIEF DESCRIPTION OF THE DRAWINGS

The inventive concept will be described in further detail by means of preferred embodiments and with reference to the accompanying drawings, in which.

DETAILED DESCRIPTION

In a preferred embodiment the telecommunications network is assumed to be a wireless local area network based on the IEEE (Institute of Electrical and Electronics Engineers) 802.11 standard without limiting the inventive concept to that kind of particular network. The teachings of this disclosure may be used in any kind of telecommunications network where the user needs to change various settings when accessing different networks and network resources.

Figure 1:
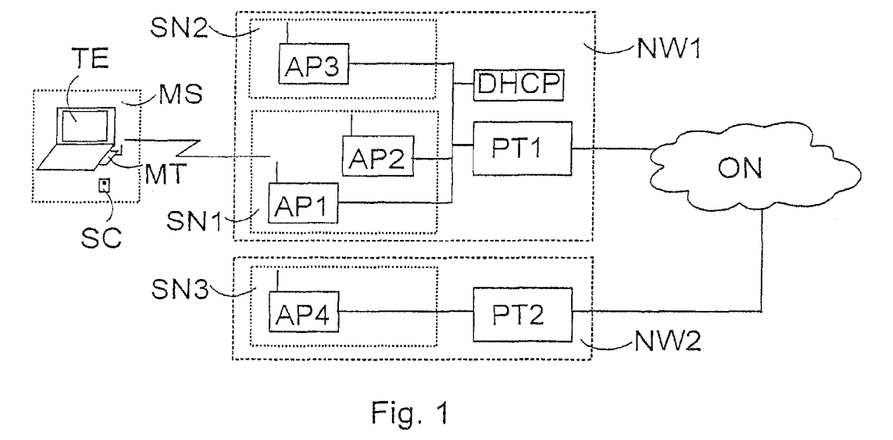
FIG. 1 is a block diagram showing a wireless local area network based on the IEEE 802.11 standard.

In FIG. 1 an example of a WLAN system based on the IEEE 802.11 is shown. A mobile terminal MS comprises terminal equipment TE, typically a portable computer, a WLAN adapter MT and according to an embodiment of this disclosure also a smart card SC. A WLAN network NW1, NW2 comprises WLAN access points AP1, AP2, AP3 and AP4 providing the access for the MS to the wired network.

The 802.11 standard defines both the physical and medium access control protocols for communication over the air interface. The physical layer specification of the IEEE 802.11 encompasses three transmission options: one infrared option, direct sequence spread spectrum (DSSS) option, and frequency hopped spread spectrum (FHSS) option. Both spread spectrum techniques are used in the 2.4 GHz band because of wide availability in many countries. The IEEE 802.11 standard supports the DSSS for use with BPSK modulation at a 1 Mbps data rate, or QPSK modulation at a 2 Mbps data rate. The FHSS is supported under 802.11 with GFSK modulation and two hopping patterns with data rates of 1 Mbps and 2 Mbps. Also higher bit rates are expected in the near future.

The fundamental access method of the IEEE 802.11 MAC (Medium Access Control) is known as carrier sense multiple access with collision avoidance (CSMA/CA). The CSMA/CA works by a "listen before talk scheme". This means that a mobile terminal MS wishing to transmit must first sense the radio channel based on the received signal strength to determine if another terminal is transmitting. If the medium is not busy, the transmission may proceed. The CSMA/CA scheme implements a minimum time gap between frames from a given user. Once a frame has been sent from a given transmitting terminal MS, that terminal MS must wait until the time gap is up before trying to retransmit. Once the time has passed, the terminal MS selects a random amount of time (called a backoff interval) to wait before "listening" again to verify a clear channel on which to transmit. If the channel is still busy, the following backoff interval is selected that is shorter than the first backoff interval. This process is repeated until the waiting time approaches zero and the terminal MS is allowed to transmit. It is possible to use acknowledged data transfer, i.e. after a data frame is received, an acknowledgement frame is sent back verifying a successful data transmission.

WLAN mobile terminals MS may form an ad-hoc network simply by establishing a connection to another terminal. An ad-hoc network is a grouping of mobile stations for the purposes of internet-worked communications without the need of wired network infrastructure. An ad-hoc network forms a basic service set (BSS). Infrastructure networks are established to provide mobile terminals MS with specific services and range extension. Infrastructure networks are established by creating connections between access points AP1-4 and terminals MS. Access points AP1-4 provide network connectivity to MS, thus forming an extended service set (ESS). At a minimum, access points AP1-4 control the allocation of transmit times, receive, buffer, and transmit data between the mobile terminal MS and the wired parts of the network NW1, NW2. A logical WLAN network NW1, NW2 may comprise one or more sub-networks SN1, SN2 and SN3. The sub-networks comprise a plurality of access points AP1-4. For instance, NW1 comprises two sub-networks SN1 and SN2, the sub-network SN1 comprises two access points AP1 and AP2 and the SN2 comprises access point AP3. A logical WLAN network NW1, NW2 may also provide gateway access to other networks ON, such as the Internet, via a device called portal PT1, PT2. The portal PT1, PT2 is a logical entity that specifies the integration point where the IEEE802.11 specific network NW1, NW2 integrates with the non-IEEE802.11 network ON. Typically the WLAN network NW1, NW2 also comprises other servers, such as a DHCP (Dynamic Host Configuration Protocol) server which allocates IP addresses in the network NW1.

Security provisions are addressed in the standard as an optional feature. The data security is accomplished by an encryption technique known as the Wired Equivalent Privacy (WEP). WEP is based on protecting the transmitted data over the radio interface using an encryption key and an RC4 encryption algorithm. The IEEE 802.11 standard recommends 40 bit encryption keys but it also allows other key lengths. WEP, when enabled, only protects the data packet information and does not protect the physical layer header so that other mobile terminals in the network can listen to the control data needed to manage the network. However, the other mobile terminals cannot decrypt the data portions of the packet.

Individual microcells of access points AP1-4 overlap to allow continuous communication with wired parts of network NW1, NW2. The mobile terminal MS may then connect to an access point with better signal strength as it moves to another geographic area. For more details on the IEEE802.11 WLANs, reference is made to IEEE802.11 standards such as "Draft International Standard ISO/IEC 8802-11 IEEE 802.11/D10, January 1999, Part 11: Wireless LAN Medium Access Control (MAC) and Physical Layer (PHY) Specifications".

Figure 2:
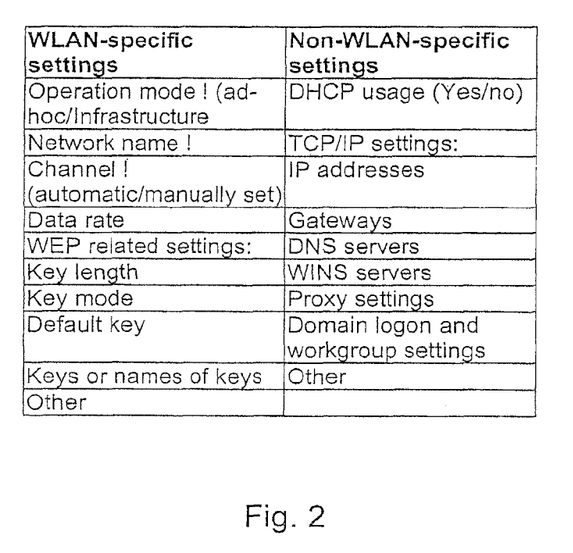
FIG. 2 is a table illustrating the settings described in information sets.

According to another embodiment, the settings needed to access networks and different network resources are collected together and stored as information sets in the mobile terminal MS. Information sets advantageously comprise network names identifying networks belonging to the information sets. The information sets are advantageously determined separately for each network and they may be considered and called as profiles. Information sets may comprise basically any kind of settings needed to access the WLAN network NW1, NW2 in question and they may advantageously also comprise non-WLAN specific settings as illustrated in FIG. 2. Besides the settings needed to access networks, the information sets may also comprise settings needed to access network resources enabling different services by the network. The terminal MS basically always uses some network resources when it accesses a network NW1, NW2, for instance the transmission capability of the access point AP1 is used to transfer data to the portal PT1. Information sets are preferably determined for logically separate networks. For instance, the NW1 and NW2 advantageously have their own information sets.

The operation mode setting defines whether ad-hoc or infrastructure modes may be used. There are advantageously different information sets for ad-hoc and infrastructure communications, that is, an information set with ad-hoc mentioned in operation mode setting will be used when connecting another terminal. The network name setting defines the network names that belong to the information set. As the logical WLAN networks NW1, NW2 may be segmented into multiple sub-networks SN1-3, all sub-networks SN1-3 preferably have their own network names. An information set may thus comprise more than one wireless network name. If the used operation mode is infrastructure, the used network name is called ESSID (Extended Service Set Identifier) and if the used operation mode is ad-hoc, the network name is called BSSID (Basic Service Set Identifier).

A network identifier may be stored in the network name setting to cover more than one network name. A network identifier advantageously contains wildcard characters, such as '?' and '*', and by using wildcard characters it is possible to specify a group of network names. For this to work, every sub-network belonging to the same logical network should have a similar (not the same) name; for instance, the SN1 could have the network name NW1LAN1 and the SN2 could have the network name NW1LAN2. The network name setting of the information set of the NW1 may then be NW1WLAN*.

The channel settings define whether the operating radio channel is selected automatically or manually. The radio channel may be selected from a set specific to the country where the terminal MS is used. For instance, in most European countries channels 1-13 may be used, whereas in the US and Canada channels 1-11 may be used. The first three settings marked with '!' are essential and should be stored within each information set. The data rate setting may comprise information about the possible data rates, e.g. the network NW1, NW2 may provide 2 Mbps data rate. Thus the terminal MS may use the data rate setting to select the network with the highest data rate. Security settings related to WEP preferably comprise key length, key mode, selected default key and keys or information on the keys used for authentication and/or encryption. It is suggested that the keys should not be part of the information set; they can be stored elsewhere but the information set references them. Other WLAN specific settings may comprise radio-related parameters or any other settings that may be needed. Other settings may be for instance different settings mentioned in the IEEE 802.11 standard, such as the fragmentation threshold or the listening interval.

Non-WLAN specific settings are not mandatory, but it is suggested that they be included especially in information sets for infrastructure communications (operation mode is infrastructure). Typically the most important settings are DHCP settings, TCP/IP (Transport Control Protocol/Internet Protocol) settings and domain logon and work-group settings. DHCP settings define whether DHCP is used or not. TCP/IP settings comprise information about the used IP addresses, gateways, DNS (Domain Name System) servers and WINS (Windows Internet Naming Service) servers. Proxy settings specify the correct WWW (World Wide Web) browser settings. Domain logon and workgroup settings may be needed to enable access to specific network services such as shared folders, email server, network printers, mapped network drives and Intranet pages. Also other kind of non-WLAN settings may be stored in the information sets.

Some settings may be different for different sub-networks within a single information set. In this case an information set advantageously comprises the network names of the sub-networks belonging to the information set and the information set-specific settings are stored separately for every sub-network. For instance, the authentication or encryption keys may be different for different sub-networks. When using the information in information sets, the MS may then choose a correct setting based on the network name that is used.

The information sets may be stored in files and they may be distributed to users basically through any media. For instance, it is possible to download information sets from a WWW page or send the information sets by email. According to one embodiment, the mobile terminal MS also comprises a smart card SC where the information sets are stored. The smart card is preferably inserted in the MT, but it is also possible to use the SC with a card reader of the TE.

Figure 3:
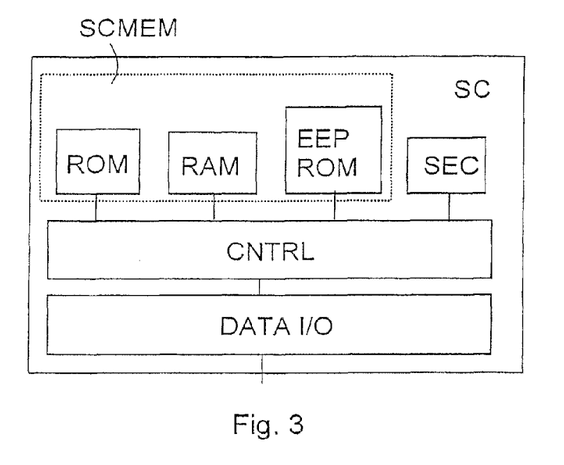
FIG. 3 is a block diagram illustrating a smart card.

FIG. 3 is a block diagram illustrating a smart card SC. The smart card SC is typically a credit-card sized plastic card comprising a microprocessor. Also smaller smart cards may be used, such as the plug-in smart cards used in the GSM (Global System for Mobile communication) system for storing the SIM (Subscriber Identity Module). The surface of the smart card SC comprises electric contacts that are used to power up the SC and to transfer control and data signals between the data bus DATA I/O and a card reader of a terminal, such as the MT. Thus data is transmitted between the smart card SC and the other parts of the terminal MS through the DATA I/O.

A smart card controller CNTRL is arranged to control the functionality of the SC using the smart card memory SCMEM. Typically CNTRL functions based on a program code stored in a read-only memory ROM. Storage memory EEPROM (Electrically Erasable Programmable Read-Only Memory) may be used to store information that stays in the memory until it is re-stored. Data related to information sets is advantageously stored in information set specific directories of the storage memory EEPROM. If the security keys are not part of the information sets, the keys are advantageously also stored on the smart card memory SCMEM. The random access memory RAM may be used for temporary data storage. The smart card SC also comprises a security logic SEC that takes care of security features of the SC, such as the check for personal identity number (PIN). In order to allow the usage of information sets stored in the smart card SC, at least the PIN check should be used. It is also possible to use other more sophisticated access control methods such as the check for finger prints. The terminal MS comprises means for using the smart card SC, especially means for reading the electric contact and writing to the storage memory EEPROM of the smart card SC.

The IT staff may prepare needed the information sets for the users by storing the necessary settings for accessing WLAN and non-WLAN networks on the smart card SC. The smart card SC is a very convenient and easy way of using the information sets in different terminals MS and locations. A secure connection for a new user to the company networks may be easily and quickly arranged by giving him the smart card SC comprising the necessary information sets. The information sets (for instance of NW1 and NW2) can be shown to the user by the user interface (UI) of the terminal MS.

Figure 4:
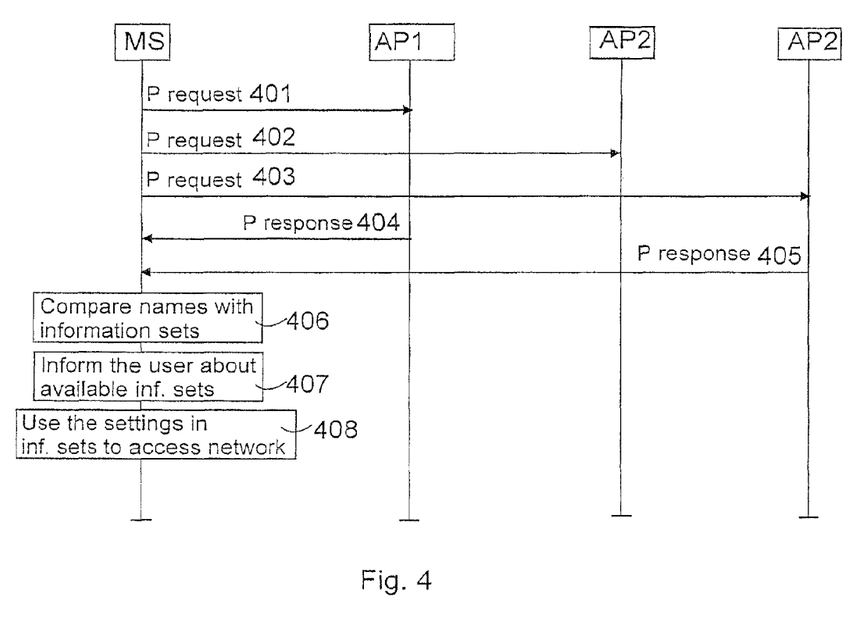
FIG. 4 is a signaling diagram illustrating the usage of information sets.

FIG. 4 illustrates the access to a network utilizing the stored information sets. As a user of the MS wishes to originate a connection to a locally available network, the WLAN functionality is activated. In order to find out the information sets and networks that may be used in the current location area of the terminal MS, the MS performs a scanning of available networks. Scanning for access points AP1-4 as such is a basic functionality defined in the IEEE 802.11 standard, where the MS checks radio channels one-by-one by sending network identity requests (Probe requests) and searching for network identity responses (Probe responses). The MS sends Probe requests 401, 402, 403 to local access points, for instance to AP1, AP2 and AP3, and waits for Probe responses. For instance, the access points AP1 and AP3 receive the Probe requests 401, 403 and send back Probe responses comprising information of the access point 404, 405. Preferably the Probe responses 404, 405 comprise network names of the sub-networks SN1-3 the access points AP1-4 belong to.

According to an embodiment, the MS uses the scanned information of the networks to determine which information sets may be used 406. For instance, as the MS receives Probe responses 404, 405 from the AP1 and AP3, it compares 406 the network names in the Probe responses 404, 405 to the network names in the stored information sets and finds out that sub-networks SN1 and SN2 are available. As the group of network names is advantageously specified (e.g. NW1LAN*), the network names (NW1LAN1, NW1LAN2) belonging to the same information set can be easily found. Further, the information set of the SN1 is then fully available, as the network names of the SN1 (NW1LAN1) and SN2 (NW1LAN2) are found. If there are more than one access point (AP1, AP2) in a single sub-network (SN1), the MS may receive the same network name many times in separate Probe responses. Thus the terminal MS can reliably determine the available networks and information sets, typically also the existing network names and identity requests may be used.

As the terminal MS is aware of the available information sets, it preferably informs 407 the user of the MS about the available information sets. If there are more than one information set available, the user may be provided with the chance of selecting the information set to be used. Thus the user has the possibility to control the information set selection. The information set that is available and approved by the user will then be used and at least the WLAN network NW1, NW2 is accessed 408 using the settings stored within the selected information set. However, fully automatic information set selection can also be used, that is, one of the available information sets is selected without any user intervention and the settings of the selected information set are used to access a network. The information sets may be prioritized to enable the fully automatic selection.

The wireless connection to the WLAN network NW1, NW2 may be established using the WLAN specific settings of the selected information set and the connection to other networks or servers may be established using the non-WLAN-specific settings. The most important WLAN specific settings needed by the WLAN functionality of the terminal MS were illustrated in FIG. 2. The WLAN specific settings are related for establishing the wireless connection, that is, for accessing an access point AP1-4 and its resources. The non-WLAN specific settings are mainly used by the operation system of the MS for providing support for other applications of the terminal. The non-WLAN specific settings are often used to access different network resources, for instance the DHCP server is accessed in order to obtain an IP address. The information set functionality according to an embodiment takes care that the correct settings related to the WLAN connection establishment and to the non-WLAN specific system are selected automatically according to the selected information set. For instance, the operation system specific system settings such as the TCP/IP settings are changed. The usage of the settings illustrated in FIG. 2 to access networks and network resources is as such familiar to a man skilled in the art.

Scanning is preferably carried out each time the user activates the WLAN functionality and wishes to access a network. However, it is also possible to perform the scanning during an on-going connection e.g. periodically. In FIG. 4 the operation mode was the infrastructure mode and scanning of access points was described. The scanning may as well be done for other terminals (ad-hoc mode) and the terminals at the area may send their identities. The identities may then be compared to the stored information sets and the available information sets for ad-hoc mode may be used. Thus the accessed network may actually be another terminal and an ad-hoc network may be established.

In addition to the example illustrated in FIG. 4, the settings of the selected information set may also be used to access another network ON, for instance a corporate Intranet email server in another country. Thus it is possible to access a first network by using first settings of an information set and then use services of a second network using second settings of the information set.

One embodiment enables easy access to WLAN network NW1, NW2 and also to other networks ON. When the information sets are pre-stored, the user of MS does not have to be aware of any network or system settings needed. In most cases the settings can also be changed without restarting the system. When the information sets are stored on the smart card SC, the IT staff can easily store and tailor all needed network and system settings for each user. The users may then easily change the used terminal just by inserting the smart card SC. The information sets may comprise all needed WLAN specific and non-WLAN specific settings e.g. to access a company database or an email server from the WLAN of a branch office located in another country. As the available networks and information sets can be detected automatically, the user does not have to select the correct information set, only if there are multiple information sets (networks) available, the user may select the preferred information set (network).

Figure 5:
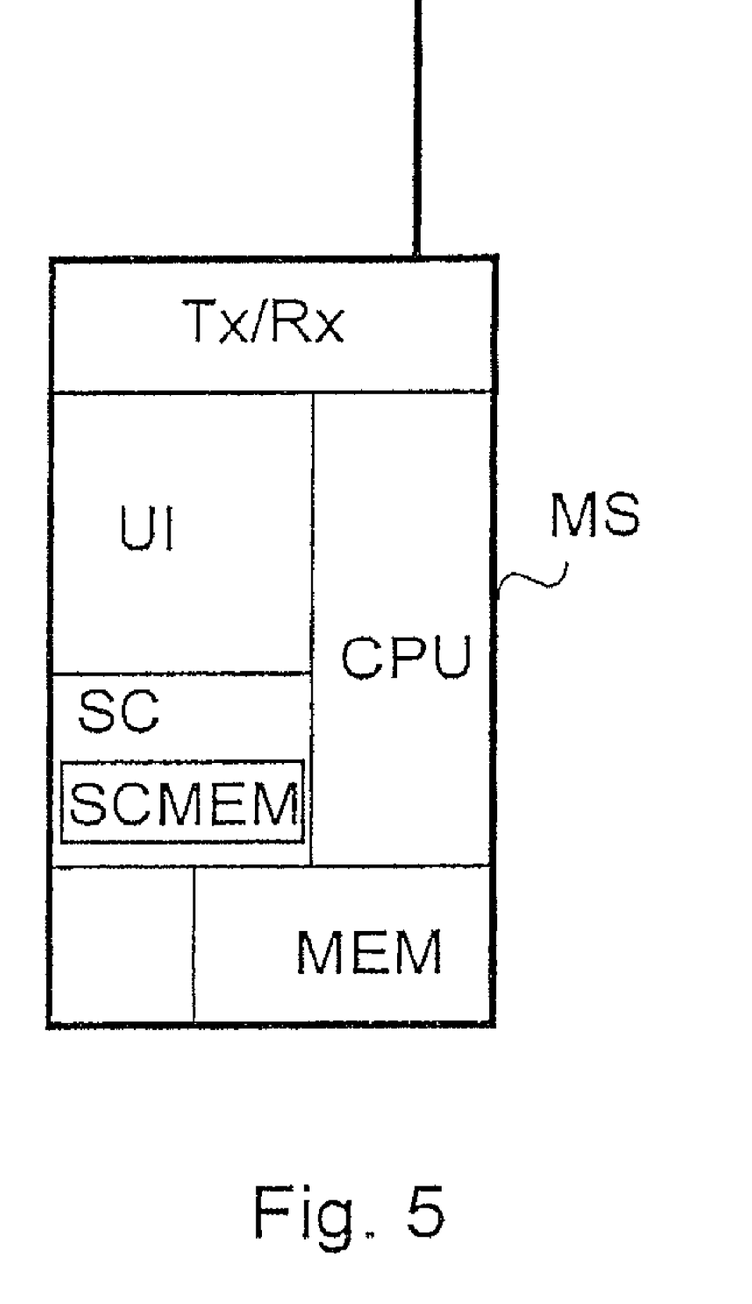
FIG. 5 is a block diagram illustrating a mobile station according to an embodiment of this disclosure.

FIG. 5 illustrates the functional blocks of a mobile terminal MS according to an embodiment. The terminal MS comprises a transceiver Tx/Rx with antennas to communicate with the networks NW1, NW2 and with other terminals, user interface means UI, a control unit CPU, memory MEM and a smart card SC. The transceiver Tx/Rx may be typical IEEE 802.11 compliant transmitting and receiving equipment for transmitting and receiving data over the radio interface. As already described the smart card comprises a memory SCMEM where the information sets may be advantageously stored as information sets. The memory of the terminal MS thus comprises two parts, a memory MEM and a smart card memory SCMEM.

The user interface means UI generally comprise a keyboard, a display, a loudspeaker and a microphone, which are not presented in FIG. 6. With the user interface means UI, the control unit CPU may show the available information sets to the subscriber (407) and the subscriber may then choose the information set to be used. By using the user interface means UI, it is advantageously possible to view and change the settings of stored information sets and give further instructions to the control unit CPU. According to an embodiment, the user may also form new information sets or modify already existing information sets by using the user interface means UI.

The control unit CPU controls the inventive functions described earlier in connection with information sets. The CPU and the memory MEM, SCMEM provide memory means for storing the information sets advantageously on the smart card memory SCMEM using the smart card reader of the MS and the smart card controller CNTRL. The CPU is arranged to provide scanning means, i.e. to send Probe requests (401-403) and to receive Probe responses (404, 405) using the transceiver Tx/Rx. Further, the control unit CPU may be arranged to provide the determination means for determining available information sets by comparing names to the stored information sets (406). The access means, i.e. the access to network based on the settings in the selected information set (408), is also arranged by the control unit CPU utilizing the transceiver Tx/Rx. All the inventive functionalities of the control unit CPU may be implemented by using the existing processors and memory MEM, SCMEM of the mobile terminals MS. It should be noted that the functional blocks of the MS illustrated in FIG. 5 may be divided between the MT, TE and SC illustrated in FIG. 1.

It is also possible to use the above described procedures related to information sets in multimode WLAN terminals that also comprise other mobile telecommunication functionalities, such as the GSM functionality. According to an embodiment, it is also possible to apply network access using information sets in equipment based on other kinds of wireless local area networking techniques, for instance in Bluetooth, HiperLAN (High Performance Radio Local Area Network) or BRAN (Broadband Radio Access Networks) equipment.

It is obvious to those skilled in the art that as technology advances, the inventive concept can be implemented in many different ways. Therefore the inventive concept as represented by the above exemplary embodiments are not limited to the above examples but may vary within the scope and spirit of the appended claims.

What is claimed is:

1. A method, comprising:
storing information sets describing settings used to access wireless local area networks and their security settings in a terminal;
wherein the security settings comprise at least a one of key length, key mode, default key or information on one or more keys for authentication and/or encryption;
scanning for information related to names of available wireless local area networks using the at least one terminal;
determining available information sets by comparing the information related to names of available wireless local area networks to the stored information sets; and
accessing at least one wireless local area network based on settings described in an available information set, and
wherein the storing stores network names of wireless local area networks associated with the stored information sets, the scanning sends network identity requests and searches for network identity responses, and the determining available information sets determines the available information sets by comparing the stored network names to the scanned information related to names of available wireless local area networks.

2. The method of claim 1, further comprising:
informing a user of the terminal about the available information sets;
receiving a user's selection of one of the available information sets; and
accessing at least one wireless local area network based on the settings described in the available information set selected by the user.

3. The method of claim 1, wherein the stored information sets are stored separately for each wireless local area network as profiles.

4. The method of claim 1, further comprising:
storing network identifiers representing a group of network names using wildcard characters in the stored information sets; and
determining the available information sets by comparing the stored network identifiers to the scanned information related to names of available wireless local area networks.

5. A method according to claim 1, wherein the information set comprises at least one of the following:
dynamic host control protocol settings, transport control protocol/Internet protocol settings, proxy settings, or domain logon and work-group settings.

6. A method according to claim 1, wherein the information sets describe first settings needed to access wireless local area networks and second settings for accessing services via wireless local area networks, and at least one wireless local area network is accessed on the basis of first settings described in the available information set and at least one service is accessed via the accessed wireless local area network on the basis of second settings described in the available information set.

7. A method according to claim 1, further comprising modifying at least one of the available information sets in accordance with a user's input.

8. A method according to claim 1, further comprising modifying at least one priority of the available information sets in accordance with a user's input.

9. An apparatus comprising:
at least one processor; and
at least one memory including computer program code;
said at least one memory and said computer program code configured to, with said at least one processor, cause said apparatus to perform at least the following:
store information sets relating to settings used to access wireless local area networks and their security settings, including information relating to names of the wireless local area networks, wherein the security settings comprise at least one of key length, key mode, default key or information on one or more keys for authentication and/or encryption; and
scan information related to identifying names of available wireless local area networks at least by sending network identity requests and searching for network identity responses;
determine available information sets by comparing the information related to names of the available wireless networks to information sets stored in the memory and by comparing the stored network names to the scanned information identifying the names of the available wireless local area networks; and
arrange access to at least one wireless local area network based on settings described in one or more of the available information sets.

10. An apparatus according to claim 9, said at least one memory and said computer program code configured to, with said at least one processor, cause said apparatus to further perform at least the following:
inform a user of the apparatus about the available information sets, and
access at least one wireless local area network based on settings relating to said one of the available information sets selected by a user by an input to a user interface.

11. An apparatus according to claim 9, said at least one memory and said computer program code configured to, with said at least one processor, cause said apparatus to further perform at least the following:
access a smart card, said smart card being configured to store the information sets as network-specific profiles therein.

12. An apparatus according to claim 9, wherein the wireless local area network access is based on IEEE 802.11 and the information settings comprise IEEE 802.11 specific settings.

13. The apparatus of claim 9, where the information set comprises at least one of the following: dynamic host control protocol settings, transport control protocol/Internet protocol settings, proxy settings, or domain logon and work-group settings.

14. The apparatus of claim 9, wherein the information sets describe first settings needed to access wireless local area networks and second settings for accessing services via the wireless local networks, and said at least one memory and said computer program code configured to, with said at least one processor, cause said apparatus to further perform at least the following:

access at least one wireless local area network on the basis of first settings described in the available information set and at least one service via the accessed wireless local area network on the basis of second settings described in the available information set.

15. The apparatus of claim 9, said at least one memory and said computer program code configured to, with said at least one processor, cause said apparatus to further perform at least the following:

modify at least one of the available information sets in accordance with a user's input received through a user interface of the apparatus.

16. The apparatus of claim 9, said at least one memory and said computer program code configured to, with said at least one processor, cause said apparatus to further perform at least the following:

modify at least one priority of the available information sets in accordance with a user's input received through a user interface of the apparatus.

17. A non-transistory computer readable memory comprising a computer program code which, when executed by an apparatus including a processor and a memory, is configured to cause the apparatus to store information sets relating to settings used to access wireless local area networks and their security settings, including information relating to names of the wireless local area networks, wherein the security settings comprise at least one of key length, key mode, default key or information on one or more keys for authentication and/or encryption; and scan information related to identifying names of available wireless local area networks at least by sending network identity requests and searching for network identity responses;

determine available information sets by comparing the information related to names of the available wireless networks to information sets stored in the memory and by comparing the stored network names to the scanned information identifying the names of the available wireless local area networks; and arrange access to at least one wireless local area network based on settings described in one or more of the available information sets.

18. The computer readable memory as recited in claim 17 wherein the computer program code stored in the computer readable memory is configured to cause the apparatus to:

inform a user of the apparatus about the available information sets, and access at least one wireless local area network based on settings relating to said one of the available information sets selected by a user by an input to a user interface.

19. The computer readable memory as recited in claim 17 wherein the computer program code stored in the computer readable memory is configured to cause the apparatus to:

modify at least one of the available information sets in accordance with a user's input received through a user interface of the apparatus.

20. The computer readable memory as recited in claim 17 wherein the computer program code stored in the computer readable memory is configured to cause the apparatus to:

modify at least one priority of the available information sets in accordance with a user's input received through a user interface of the apparatus.

* * * * *